(12) United States Patent
Agashe et al.

(10) Patent No.: US 8,185,060 B2
(45) Date of Patent: May 22, 2012

(54) SERVING BASE STATION SELECTION USING BACKHAUL QUALITY INFORMATION

(75) Inventors: Parag A. Agashe, San Diego, CA (US); Naga Bhushan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 442 days.

(21) Appl. No.: 12/423,513

(22) Filed: Apr. 14, 2009

(65) Prior Publication Data

US 2009/0264123 A1 Oct. 22, 2009

Related U.S. Application Data

(60) Provisional application No. 61/046,996, filed on Apr. 22, 2008.

(51) Int. Cl.
*H04B 1/00* (2006.01)

(52) U.S. Cl. .......................................... 455/69

(58) Field of Classification Search .................. 455/561, 455/3.05, 562, 437, 436, 438, 439, 435.2, 455/452.2, 557, 67.11, 444, 575.7, 88, 434, 455/69, 422.1, 507, 418, 435.1; 370/335, 370/342, 344, 319, 343, 233, 331, 252, 474, 370/338, 328, 32

See application file for complete search history.

(56) References Cited

U.S. PATENT DOCUMENTS

| | | | | |
|---|---|---|---|---|
| 7,855,977 | B2* | 12/2010 | Morrison et al. | 370/252 |
| 7,995,493 | B2* | 8/2011 | Anderlind et al. | 370/252 |
| 2006/0056365 | A1* | 3/2006 | Das et al. | 370/338 |
| 2007/0111757 | A1* | 5/2007 | Cao et al. | 455/561 |
| 2007/0133427 | A1* | 6/2007 | Taylor et al. | 370/252 |
| 2007/0177510 | A1* | 8/2007 | Natarajan et al. | 370/238 |
| 2008/0002631 | A1* | 1/2008 | Ramachandran | 370/338 |

(Continued)

FOREIGN PATENT DOCUMENTS

GB 2452794 A 3/2009

(Continued)

OTHER PUBLICATIONS

Ferrus R, et al., "Evaluation of a Cell Selection Framework for Radio Access Networks considering Backhaul Resource Limitations" IEEE International Symposium on Personal, Indoor and Mobile Radio Communications. PIMRC, IEEE; PI , XX, Sep. 1, 2007, pp. 1-5, XP031168133.

(Continued)

*Primary Examiner* — Melody Mehrpour
(74) *Attorney, Agent, or Firm* — Florin Corie; Kam T. Tam

(57) ABSTRACT

Techniques for selecting a serving base station for a terminal by taking into consideration the backhaul quality of candidate base stations are described. In one design, a base station may determine backhaul quality information indicative of its current backhaul quality. The base station may send the backhaul quality information, e.g., in an overhead message sent over the air to terminals or in a backhaul message sent to neighbor base stations or a network controller. A server selection entity may receive backhaul quality information for at least one candidate base station for the terminal. The server selection entity may also determine at least one metric for each candidate base station. The server selection entity may then select the serving base station for the terminal based on the backhaul quality information and the at least one metric for the at least one candidate base station.

32 Claims, 7 Drawing Sheets

U.S. PATENT DOCUMENTS

| | | | |
|---|---|---|---|
| 2008/0080436 A1* | 4/2008 | Sandhu et al. | 370/338 |
| 2008/0293404 A1* | 11/2008 | Scherzer et al. | 455/426.1 |
| 2009/0042557 A1* | 2/2009 | Vardi et al. | 455/422.1 |
| 2009/0124284 A1* | 5/2009 | Scherzer et al. | 455/552.1 |
| 2009/0180428 A1* | 7/2009 | Viswanath | 370/328 |
| 2009/0197603 A1 | 8/2009 | Ji | |
| 2009/0213825 A1* | 8/2009 | Gupta et al. | 370/338 |
| 2009/0247181 A1* | 10/2009 | Palanki et al. | 455/452.2 |
| 2009/0257361 A1* | 10/2009 | Deshpande et al. | 370/252 |
| 2010/0165857 A1* | 7/2010 | Meylan et al. | 370/252 |

FOREIGN PATENT DOCUMENTS

| | | |
|---|---|---|
| GB | 2454872 A | 5/2009 |
| JP | 2007503173 A | 2/2007 |
| WO | WO9933307 | 7/1999 |
| WO | WO2007001847 A1 | 1/2007 |
| WO | WO2007041320 | 4/2007 |

OTHER PUBLICATIONS

International Search Report and Written Opinion—PCT/US2009/040854, International Search Authority—European Patent Office—Sep. 3, 2009.

Olmos J, et al., "A Functional End-to-End QoS Architecture Enabling Radio and IP Transport Coordination" IEEE Wireless Communications and Networking Conference, 2007, WCNC 2007, Mar. 11-15, 2007, Hong Kong, IEEE Operations Center, Piscataway, NJ, Mar. 1, 2007, pp. 4348-4353, XP031097931.

* cited by examiner

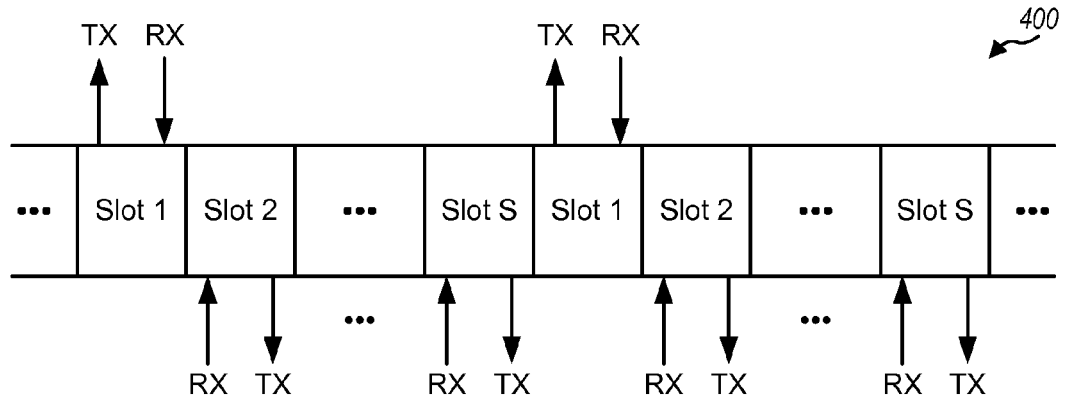
*FIG. 4*
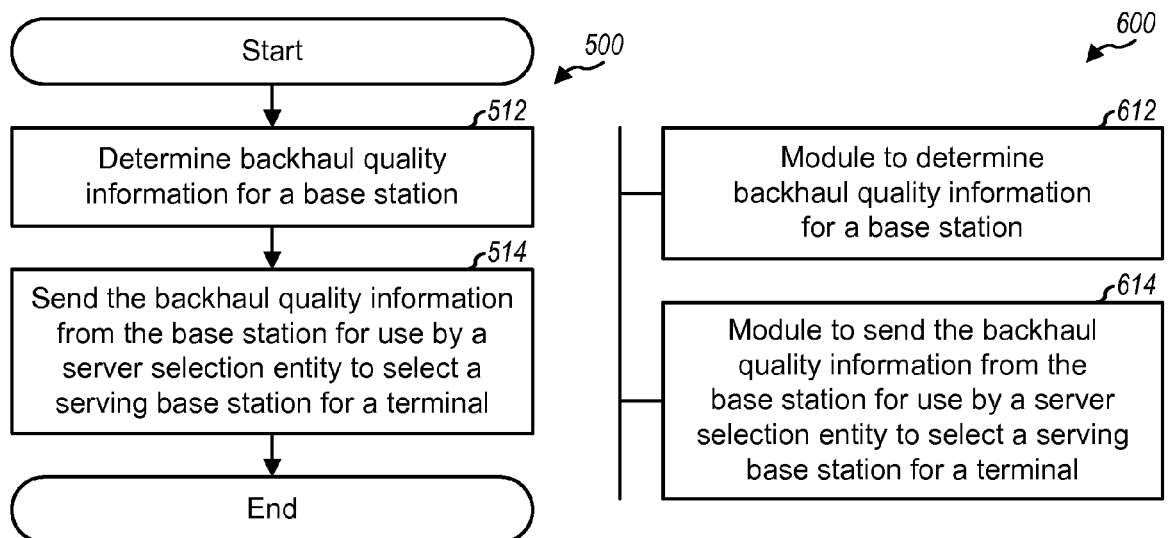
*FIG. 5*
*FIG. 6*

United States Patent US 8,185,060 B2

SERVING BASE STATION SELECTION USING BACKHAUL QUALITY INFORMATION

The present application claims priority to provisional U.S. Application Ser. No. 61/046,996, entitled "SYSTEMS AND METHODS FOR BACKHAUL QUALITY INFORMATION EXCHANGE AMONG BASE STATIONS," filed Apr. 22, 2008, assigned to the assignee hereof and incorporated herein by reference.

BACKGROUND

I. Field

The present disclosure relates generally to communication, and more specifically to techniques for selecting a serving base station for a terminal in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of terminals. A terminal may be within the coverage of zero or more base stations at any given moment. If more than one base station is available, then it is desirable to select a suitable base station to serve the terminal such that good performance can be achieved for the terminal while improving network capacity.

SUMMARY

Techniques for selecting a serving base station for a terminal in a wireless communication network are described herein. In an aspect, the serving base station may be selected by taking into consideration the backhaul quality of candidate base stations. Each candidate base station is a potential serving base station for the terminal. A server selection entity may select the serving base station for the terminal when the terminal first accesses the network or is handed off from a current serving base station. The server selection entity may be the terminal, the current serving base station, or some other network entity. The server selection entity may obtain backhaul quality information for the candidate base stations and may use this information to select the serving base station for the terminal.

In one design, a base station may determine backhaul quality information indicative of its current backhaul quality. The backhaul quality information may comprise residual capacity of a backhaul for the base station, full capacity of the backhaul, current loading or utilization of the backhaul capacity, energy efficiency of the backhaul, etc. The base station may send the backhaul quality information for use by the server selection entity. In one design, the base station may generate an overhead message comprising the backhaul quality information and may send the overhead message over the air to terminals. In another design, the base station may generate a backhaul message comprising the backhaul quality information and may send the message via the backhaul to neighbor base stations or a network controller operating as the server selection entity.

In another design, the server selection entity may receive backhaul quality information for at least one candidate base station for a terminal, e.g., via an overhead message or a backhaul message from each candidate base station. The server selection entity may also determine at least one metric for each candidate base station. The server selection entity may then select the serving base station for the terminal based on the backhaul quality information and the at least one metric for the at least one candidate base station.

In yet another design, a terminal may receive an overhead message from each of at least one candidate base station. The terminal may obtain backhaul quality information for each candidate base station from the overhead message received from that candidate base station. The terminal may facilitate selection of the serving base station based on the backhaul quality information. In one design, the terminal may select the serving base station based on the backhaul quality information. In another design, the terminal may send the backhaul quality information to its current serving base station. The current serving base station may (i) use the backhaul quality information to select a new serving base station for the terminal or (ii) forward the backhaul quality information to the server selection entity.

Various aspects and features of the disclosure are described in further detail below.

BRIEF DESCRIPTION OF THE DRAWINGS

FIG. 4 shows a frame structure supporting relay.

FIGS. 5 and 6 show a process and an apparatus, respectively, for conveying backhaul quality information for a base station.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC- FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

Figure 1:
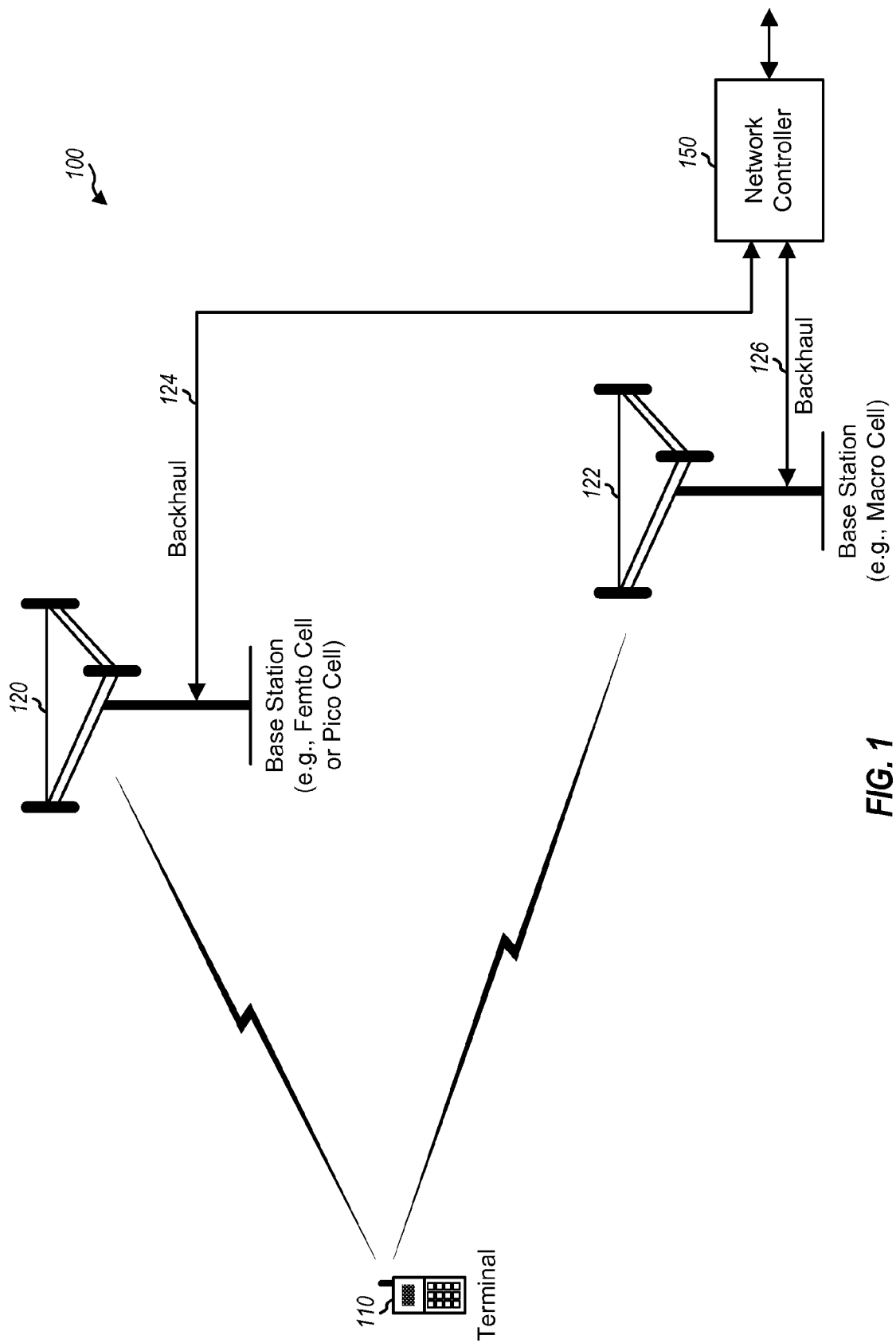
FIG. 1 shows a wireless communication network.

FIG. 1 shows a wireless communication network 100, which may include a number of base stations and other network entities. For simplicity, FIG. 1 shows only two base stations 120 and 122 and one network controller 150. A base station may be a fixed station that communicates with the terminals and may also be referred to as an access point, a Node B, an evolved Node B (eNB), etc. A base station may provide communication coverage for a particular geographic area. The overall coverage area of a base station may be partitioned into smaller areas, and each smaller area may be served by a respective base station subsystem. The term "cell" can refer to a coverage area of a base station and/or a base station subsystem serving this coverage area, depending on the context in which the term is used.

A base station may provide communication coverage for a macro cell, a pico cell, a femto cell, or some other type of cell. A macro cell may cover a relatively large geographic area (e.g., several kilometers in radius) and may support communication for all terminals with service subscription in the wireless network. A pico cell may cover a relatively small geographic area and may support communication for all terminals with service subscription. A femto cell may cover a relatively small geographic area (e.g., a home) and may support communication for a set of terminals having association with the femto cell (e.g., terminals belonging to residents of the home). A base station for a macro cell may be referred to as a macro base station. A base station for a pico cell may be referred to as a pico base station. A base station for a femto cell may be referred to as a femto base station or a home base station.

Wireless network 100 may also include relay stations. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals.

Network controller 150 may couple to a set of base stations and provide coordination and control for these base stations. Network controller 150 may communicate with base station 120 via a backhaul 124 and with base station 122 via a backhaul 126. Base stations 120 and 122 may also communicate with one another, e.g., directly or indirectly via wireless or wireline backhaul. The backhaul for each base station may be implemented with any interface and may have any capacity.

A terminal 110 may be one of many terminals supported by wireless network 100. Terminal 110 may be stationary or mobile and may also be referred to as an access terminal (AT), a mobile station (MS), a user equipment (UE), a subscriber unit, a station, etc. Terminal 110 may be a cellular phone, a personal digital assistant (PDA), a wireless modem, a wireless communication device, a handheld device, a laptop computer, a cordless phone, a wireless local loop (WLL) station, etc. Terminal 110 may communicate with a base station via the downlink and uplink. The downlink (or forward link) refers to the communication link from the base station to the terminal, and the uplink (or reverse link) refers to the communication link from the terminal to the base station.

Wireless network 100 may support HARQ in order to improve reliability of data transmission. For HARQ, a transmitter may send a transmission of data and may send one or more additional transmissions if needed until the data is decoded correctly by a receiver, or the maximum number of transmissions has been sent, or some other termination condition is encountered.

Figure 2:
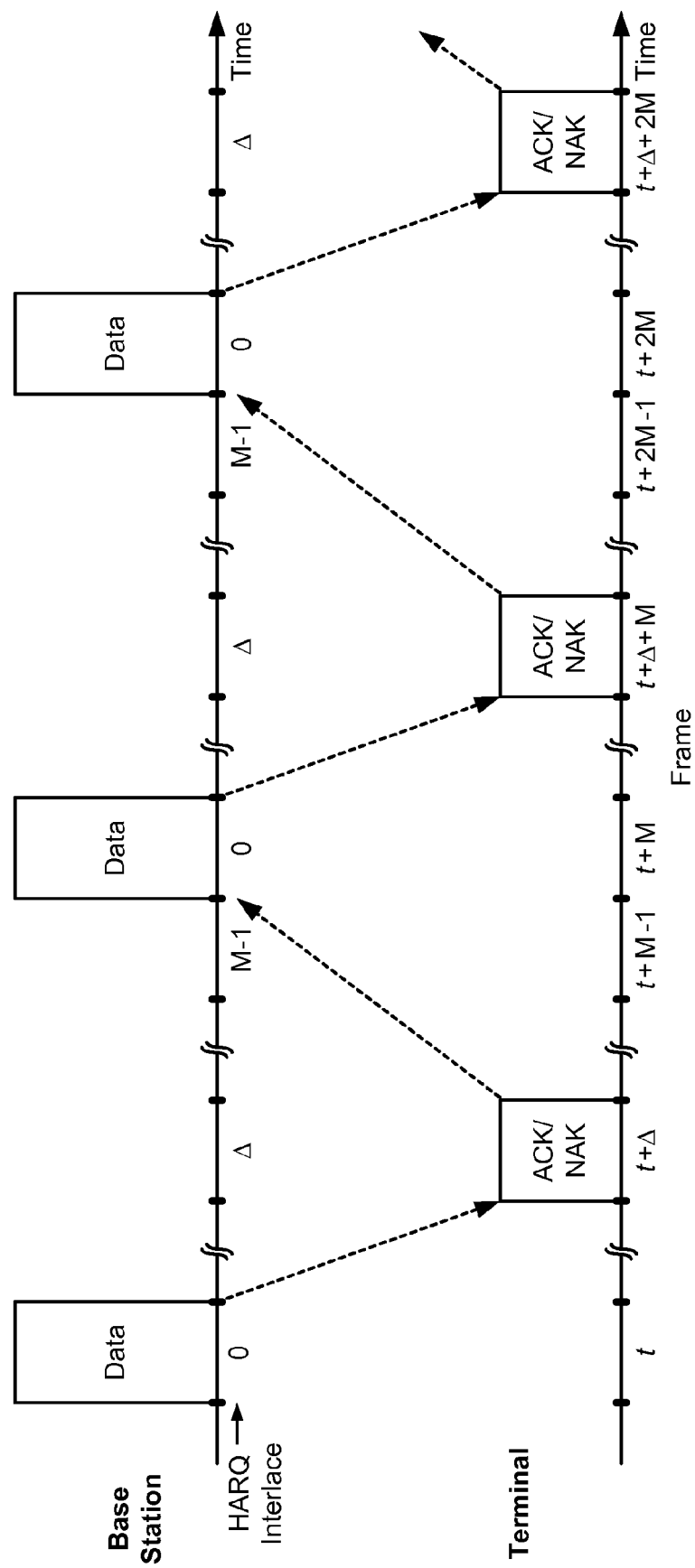
FIG. 2 shows data transmission with hybrid automatic retransmission (HARQ).

FIG. 2 shows an example data transmission on the downlink with HARQ. The transmission timeline may be partitioned into units of frames. Each frame may cover a predetermined time duration, e.g., 1 milliseconds (ms). A frame may also be referred to as a subframe, a slot, etc.

Base station 120 may have data to send to terminal 110. Base station 120 may process a data packet and send a transmission of the packet on the downlink. Terminal 110 may receive the downlink transmission and decode the received transmission. Terminal 110 may send an acknowledgement (ACK) if the packet is decoded correctly or a negative acknowledgement (NAK) if the packet is decoded in error. Base station 120 may receive the ACK/NAK feedback, send another transmission of the packet if a NAK is received, and either send a transmission of a new packet or terminate if an ACK is received. Transmission of packet and ACK/NAK feedback may continue in similar manner.

M HARQ interlaces with indices of 0 through M−1 may be defined for each of the downlink and uplink, where M may be equal to 4, 6, 8 or some other value. Each HARQ interlace may include frames that are spaced apart by M frames. A packet may be sent on one HARQ interlace, and all transmissions of the packet may be sent in different frames of the same HARQ interlace. Each transmission of the packet may be referred to as an HARQ transmission.

Wireless network 100 may be a homogeneous network with only one type of base stations, e.g., only macro base stations, or only home base stations. Wireless network 100 may also be a heterogeneous network with different types of base stations, e.g., macro base stations, pico base stations, home base stations, relay stations, etc. These different types of base stations may transmit at different power levels, have different coverage areas, and have different impact on interference in the wireless network.

Terminal 110 may be within the coverage of multiple base stations. One of these multiple base stations may be selected to serve terminal 110. The selection of a serving base station may be referred to as server selection. The base station with the best received signal quality may be selected as the serving base station. Received signal quality may be quantified by a signal-to-noise-and-interference ratio (SINR), a signal-to-noise ratio (SNR), a carrier-to-interference ratio (C/I), etc. SINR and C/I are used to denote received signal quality in much of the description below. Selecting the base station with the best downlink SINR as the serving base station may have the following drawbacks:

Not efficient when a mix of macro, pico and/or home base stations are present,

Not possible if the selected base station is a home base station with restricted association, and terminal 110 is not a member of the restricted set, and Not efficient with relay stations.

In an aspect, a serving base station may be selected based on one or more metrics. In general, a metric may be defined based on one or more parameters, which may be measured or specified. Some metrics may serve as constraints while others may serve as optimization variables. Constraints may be used to determine whether a given candidate base station can be selected as a serving base station. A constraint may be defined by requiring a metric to be above or below a predetermined threshold. The threshold may be set based on base station capability or may be relative to minimum or maximum value in a set of base stations. Optimization variables may be used to determine the most suitable base station for selection. For example, a candidate base station with the best metric may be selected, where "best" may be dependent on how the metric is defined and may refer to the highest or lowest value. The selected candidate base station may have a lower SINR than that of another candidate base station. This serving base station selection scheme may provide certain advantages, e.g., reduced interference in the network.

A serving base station may be selected based further on one or more conditions. A condition may be used to ensure that a suitable base station is selected. For example, a home base station may be selected only if it meets a condition that terminal 110 can access the home base station. As another example, a base station may be selected only if it can provide the minimum quality of service (QoS) guarantee for QoS traffic of terminal 110.

In one design, the following metrics may be used to select a serving base station:

Transmit energy metric—indicative of transmit energy,
Pathloss—indicative of channel gain between a base station and a terminal,
Effective geometry—indicative of received signal quality,
Projected data rate—indicative of data rate supportable for a terminal, and
Control channel reliability—indicative of reliability of control channels.

Each metric is described in detail below. Other metrics may also be used for server selection.

Any combination of the metrics given above may be used to select a serving base station for the downlink and/or uplink. In one design, a single base station may be selected to serve terminal 110 on both the downlink and uplink. In this design, if the best base station for the downlink is different from the best base station for the uplink, then it may be desirable to select a serving base station that is not far from the best base stations for the downlink and uplink. In another design, one base station may be selected to serve terminal 110 on the downlink, and another base station may be selected to serve terminal 110 on the uplink. In this design, the serving base station for each link may be selected based on any of the metrics.

The transmit energy metric may be determined as follows for additive white Gaussian noise (AWGN) channels and 1×1 antenna configuration with a single transmit antenna and a single receive antenna. The energy at a transmit antenna output and the energy at a receive antenna output may be expressed as:

$$E_{b,tx} = \frac{E_{b,rx}}{h} = \frac{E_{s,rx}}{r} \cdot \frac{1}{h} = \frac{E_{s,rx}}{h \cdot \log_2(1 + C/I)}, \qquad \text{Eq (1)}$$

where h is a channel gain from the transmit antenna output to the receive antenna output,
$E_{b,tx}$ is the energy-per-bit at the transmit antenna output,
$E_{b,rx}$ is the energy-per-bit at the receive antenna output,
$E_{s,rx}$ is the energy-per-symbol at the receive antenna output,
r is spectral efficiency in bit/second/Hertz (bps/Hz),
C is the received signal power, and
I is the received interference power.

Equation (1) shows the transmit energy metric for AWGN channels and 1×1 antenna configuration. The transmit energy metric may also be determined for fading channels and different antenna configurations.

For the downlink, the transmit antenna output is at a base station, and the receive antenna output is at terminal 110. For the uplink, the transmit antenna output is at terminal 110, and the receive antenna output is at a base station. C is the received power of a desired signal. I is the received power of interference and thermal noise to the desired signal. C and I may be different components of the total received power $P_{rx}$, which may be given as $P_{rx} = C + I$.

An approximation of $\log_2(1+x) \approx x/\ln 2$ may be used in a linear region. Equation (1) may then be expressed as:

$$E_{b,tx} = \frac{E_{s,rx} \cdot \ln 2}{h \cdot C/I} = \frac{\ln 2 \cdot (C/S)}{h \cdot C/I} = \frac{\ln 2 \cdot I}{h \cdot S} = \frac{\ln 2 \cdot I \cdot p}{S}, \qquad \text{Eq (2)}$$

where $E_{s,rx} = C/S$, S is the symbol rate, and p=1/h is pathloss.

As shown in equation (2), the transmit energy metric $E_{b,tx}$ is proportional to interference I and pathloss p and is inversely proportional to channel gain h and symbol rate S. Equation (2) may be used to compute a transmit energy metric for the downlink, $E_{b,tx,DL}$, as well as a transmit energy metric for the uplink, $E_{b,tx,UL}$. The pathloss for the downlink may be estimated based on pilot transmitted by a base station. The pathloss for the uplink may be assumed to be equal to the pathloss for the downlink. The interference on the uplink may be different from the interference on the downlink. The interference on the downlink may be measured by terminal 110 and used to compute $E_{b,tx,DL}$. The interference on the uplink at each candidate base station may be used to compute $E_{b,tx,UL}$. Each base station may broadcast the interference observed by that base station, which may be used to compute $E_{b,tx,UL}$. For both the downlink and uplink, the interference may be dependent on the base station for which the transmit energy metric is being computed. Furthermore, the interference may be different for different HARQ interlaces. In this case, the transmit energy metric may be estimated for each active HARQ interlace in which a candidate base station might schedule data transmission for terminal 110.

In the example shown in FIG. 1, either base station 120 or 122 may be selected as a serving base station for terminal 110. Base stations 120 and 122 may interfere with one another on the downlink. $E_{b,tx,DL}$ may be computed as follows:

If interference mitigation is performed between base stations 120 and 122 for the downlink, then the interference I to use in computing $E_{b,tx,DL}$ for base station 120 or 122 would be the sum of ambient noise and interference from other base stations. This condition often leads to the selection of the base station with the lowest pathloss.

If interference mitigation is not performed between base stations 120 and 122 for the downlink, then the interference I to use in computing $E_{b,tx,DL}$ for base station 120 would be the sum of ambient noise and interference from base station 122 as well as other base stations. Similarly, the interference I to use in computing $E_{b,tx,DL}$ for base station 122 would include the interference from base station 120.

$E_{b,tx,UL}$ may also be computed by taking into account whether or not interference mitigation is performed on the uplink.

In one design, a base station with the lowest $E_{b,tx,DL}$ may be selected to reduce interference on the downlink. A base station with the lowest $E_{b,tx,UL}$ may be selected to reduce interference on the uplink. $E_{b,tx}$ is proportional to pathloss, as shown in equation (2). A base station with the lowest pathloss may be selected to reduce interference and improve network capacity. This base station may be selected even if its downlink SINR may be weak, e.g., subject to a constraint of not being thermal limited on the downlink. The use of $E_{b,tx}$ (instead of SINR or C/I) may favor selection of a lower power base station with less pathloss, which may be more efficient in serving terminal 110.

The effective geometry may be determined as follows. A nominal geometry for a base station may be expressed as:

$$G_{nom,k} = \frac{C_{avg,k}}{I_{avg,k}}, \qquad \text{Eq (3)}$$

where $C_{avg,k}$ is the average received signal power for base station k, $I_{avg,k}$ is the average received interference power for base station k, and $G_{nom,k}$ is the nominal geometry for base station k.

An effective geometry for the downlink may be expressed as:

$$\log(1 + G_{DL,eff,k}) = \frac{F_k}{M} \cdot \sum_{m=1}^{M} \log\left(1 + \frac{C_{avg,k}}{I_{m,k}}\right), \qquad \text{Eq (4)}$$

where $I_{m,k}$ is the received interference power for base station k on HARQ interlace m.

$F_k$ is a typical fraction of resources allocated by base station k, and $G_{DL,eff,k}$ is the effective downlink geometry for base station k.

$F_k$ is the fraction of resources that might be allocated by base station k to a typical terminal. $F_k$ may be a value between zero and one (or $0 \leq F_k \leq 1$) and may be broadcast by base station k or known by terminal 110. For example, $F_k$ may be equal to one for a home base station and may be a value less than one for a macro base station. $F_k$ may also be based on the number of terminals in the cell. $F_k$ may also be set individually for each terminal and may be communicated to the terminal, e.g., via signaling.

Equation (4) converts the geometry $C_{avg,k}/I_{m,k}$ for each HARQ interlace to capacity using a capacity function of log(1+C/I). The capacities of all M HARQ interlaces are summed and divided by M to obtain an average downlink capacity. The effective downlink geometry is then computed based on the average downlink capacity and the typical amount of resources that might be allocated. Equation (4) assumes that all M HARQ interlaces may be used for terminal 110. The summation may also be performed over a subset of the M HARQ interlaces.

An effective geometry for the uplink may be expressed as:

$$\log(1 + G_{UL,eff,k}) = \frac{F_k}{M} \cdot \sum_{m=1}^{M} \log\left(1 + D \cdot \frac{pCoT_k}{IoT_{m,k}}\right), \qquad \text{Eq (5)}$$

where $IoT_{m,k}$ is an interference-over-thermal for base station k on HARQ interlace m, $pCoT_k$ is a carrier-over-thermal for uplink pilot at base station k, D is an expected data power spectral density (PSD) relative to pilot PSD, and $G_{UL,eff,k}$ is the effective uplink geometry for base station k.

$IoT_{m,k}$ may be broadcast by base station k or estimated by terminal 110 based on downlink pilot measurement. $pCoT_k$ for terminal 110 at base station k may be adjusted with a power control mechanism to achieve the desired performance for the uplink. D may be determined based on the expected data PSD and the uplink pilot PSD for terminal 110 at base station k. D may also be assigned by base station k (e.g., via Layer 1 or Layer 3 signaling) or may be determined by terminal 110 running a distributed power control algorithm. D may also be dependent on power amplifier (PA) headroom of terminal 110, an interference mitigation scheme being used, etc. A carrier-over-thermal for data, $CoT_k$, may be given as $CoT_k = D \cdot pCoT_k$.

Equation (5) converts the geometry for each HARQ interlace to capacity using a capacity function. Equation (5) then averages the capacities of all M HARQ interlaces and computes the effective uplink geometry based on the average uplink capacity.

Equations (4) and (5) provide the effective downlink and uplink geometries for over-the-air transmissions on the downlink and uplink, respectively. A base station may send data via a backhaul to a network entity. The effective downlink and uplink geometries may be computed to take into account the bandwidth of the backhaul, as follows:

$$\log(1 + G_{DL,eff,k}) = \frac{F_k}{M} \cdot \sum_{m=1}^{M} \min\left(B_k, \log\left(1 + \frac{C_{avg,k}}{I_{m,k}}\right)\right), \qquad \text{Eq (6)}$$

and $$\log(1 + G_{UL,eff,k}) = \frac{F_k}{M} \cdot \sum_{m=1}^{M} \min\left(B_k, \log\left(1 + D \cdot \frac{CoT_k}{IoT_{m,k}}\right)\right), \qquad \text{Eq (7)}$$

where $B_k$ is a normalized backhaul bandwidth for base station k and may be given in units of bps/Hz.

The projected data rates for each candidate base station may be determined based on the effective geometries, as follows:

$$R_{DL,k} = W_k \cdot \log(1 + G_{DL,eff,k}), \text{ and} \qquad \text{Eq (8)}$$

$$R_{UL,k} = W_k \cdot \log(1 + G_{UL,eff,k}) \qquad \text{Eq (9)}$$

where $W_k$ is an available bandwidth for base station k, $R_{DL,k}$ is a projected data rate for the downlink for base station k, and $R_{UL,k}$ is a projected data rate for the uplink for base station k.

$W_k$ may be the entire system bandwidth for base station k. Alternatively, $W_k$ may be a fraction of the system bandwidth and may be broadcast by base station k. The projected data rates may also be determined in other manners, e.g., using parameters other than effective geometries.

Terminal 110 may determine the downlink and uplink transmit energy metrics $E_{b,tx,DL}$ and $E_{b,tx,UL}$ for each candidate base station based on equation (2). Terminal 110 may also determine the effective downlink and uplink geometries $G_{DL,eff,k}$ and $G_{UL,eff,k}$ and/or the downlink and uplink projected data rates $R_{DL,k}$ and $R_{UL,k}$ for each candidate base station. The various parameters used to determine the transmit energy metrics, the effective geometries, and the projected data rates may be measured by terminal 110, broadcast by the candidate base stations, or obtained in other manners.

A macro base station may reserve certain HARQ interlaces based on information reported by terminals in order to improve the effective downlink geometry of a pico or home base station. This may result in selection of the pico or home base station over the macro base station, e.g., based on the transmit energy metric.

The metrics for each candidate base station may be determined based on parameters for that base station, as described above. This assumes a non-relay deployment in which the base stations can communicate via the backhaul with other network entities. For a relay deployment, data may be forwarded via one or more relay stations before reaching the backhaul. The metrics may be determined by taking into account the capabilities of the relay stations.

Figure 3:
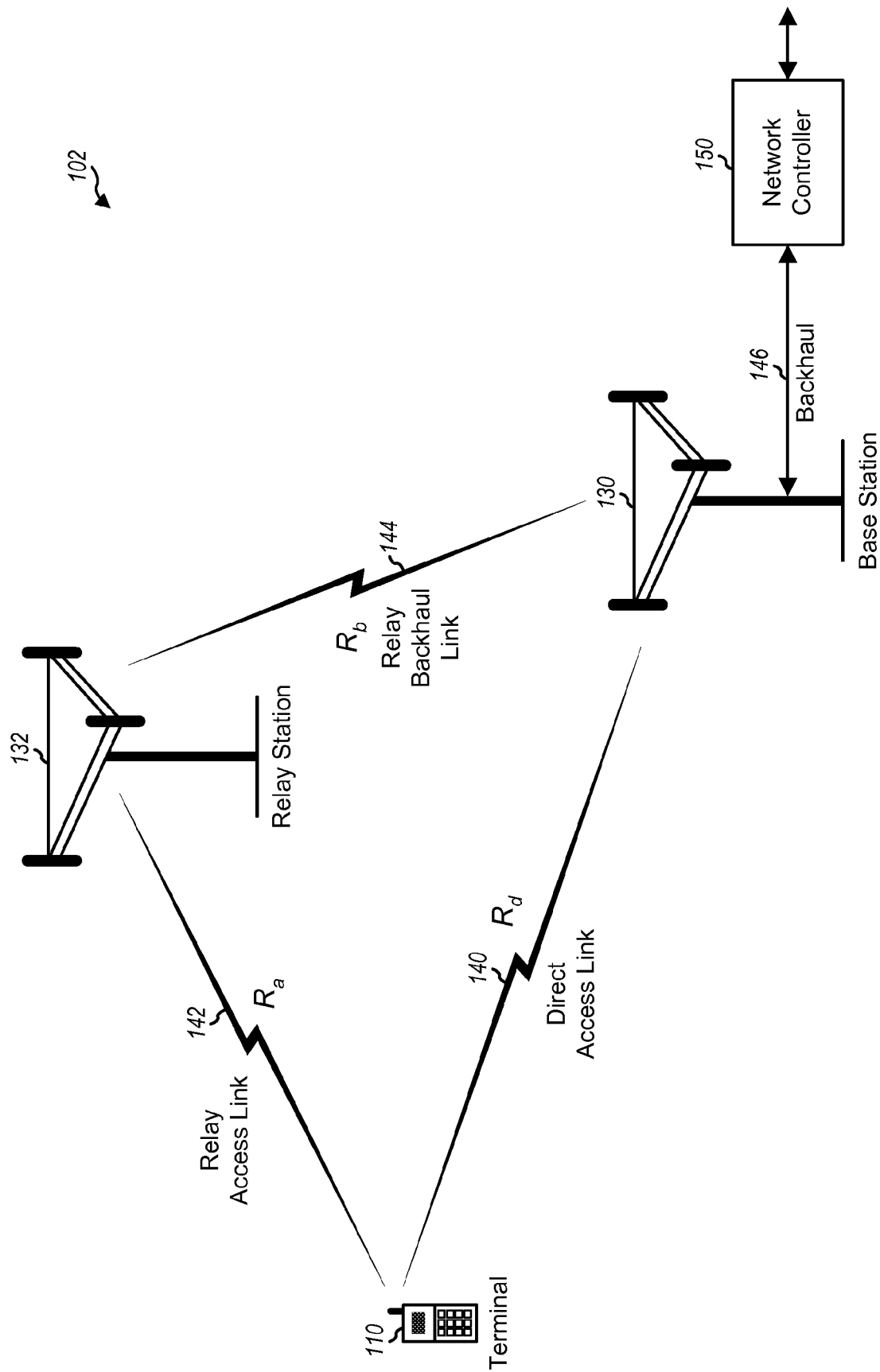
FIG. 3 shows a wireless communication network with relay.

FIG. 3 shows a wireless communication network 102 with relay. For simplicity, FIG. 3 shows only one base station 130 and one relay station 132. Terminal 110 may communicate directly with base station 130 via a direct access link 140. Base station 130 may communicate with network controller 150 via a wireline backhaul 146. Alternatively, terminal 110 may communicate with relay station 132 via a relay access link 142. Relay station 132 may communicate with base station 130 via a relay backhaul link 144.

FIG. 4 shows a frame structure 400 that may be used for network 102. Each frame may be partitioned into multiple slots 1 through S. In the example shown in FIG. 4, slot 1 in each frame may be used for relay backhaul link 144. The remaining slots 2 through S in each frame may be used for direct access link 140 and relay access link 142. In general, any number of slots may be used for each link.

Referring back to FIG. 3, terminal 110 may have a projected data rate of $R_d$ for direct access link 140 to base station 130 and a projected data rate of $R_a$ for relay access link 142 to relay station 132. Relay station 132 may have a data rate of $R_b$ for relay backhaul link 144 to base station 130. $R_a$ and $R_b$ may be given by spectral efficiency, and a projected data rate $R_r$ for relay station 132 may then be expressed as:

$$R_r = \frac{R_a \cdot R_b}{R_a + R_b}. \quad \text{Eq (10)}$$

Equation (10) assumes that there is only one terminal being served and that the split between relay access link 142 and relay backhaul link 144 is done in an optimal manner. If the split between relay access link 142 and relay backhaul link 144 is predetermined (e.g., set by base station 130 based on some criterion), then data rates (instead of spectral efficiencies) for the relay access and backhaul links may be computed. The projected data rate $R_r$ may then be given as $R_r$=min $(R_a, R_b)$ and may be compared to the data rate $R_d$ for direct access link 140. When there are multiple relay stations, the contribution of $R_a$ may be scaled to account for spatial division multiple access (SDMA) over relay access link 142. For example, $N^*R_a$ may be used if there are N relay stations transmitting simultaneously. In any case, as shown in equation (10), both relay access link 142 and relay backhaul link 144 may be taken into account in computing the projected data rate for relay station 132. The transmit energy metric $E_{b,tx}$ for relay station 132 may also be computed as the sum of $E_{b,tx}$ for relay access link 142 and $E_{b,tx}$ for relay backhaul link 144.

The downlink and uplink transmit energy metrics, the effective downlink and uplink geometries, the projected downlink and uplink data rates, and/or other metrics may be determined for each candidate base station. The metrics may be used for server selection in various manners. In some designs, the metrics may be used directly to select a serving base station. For example, in one design, the base station with the highest $R_{DL,k}$ and/or the highest $R_{UL,k}$ may be selected to obtain the highest data rate for terminal 110. In another design, the base station with the lowest $E_{b,tx,DL}$ and/or the lowest $E_{b,tx,UL}$ may be selected to obtain the least interference on the downlink and uplink, respectively.

In other designs, multiple metrics may be combined based on a function to obtain an overall metric. The base station with the best overall metric may then be selected. In one design, the base station with the highest $R_{DL,k}$ and/or $R_{UL,k}$ among all base stations with $E_{b,tx,DL}$ and/or $E_{b,tx,UL}$ below predetermined thresholds may be selected. This design may provide the highest data rate for terminal 110 while maintaining interference below target levels. For this design, an overall metric may be defined based on $R_{DL,k}$ and/or $R_{UL,k}$ and may be set to zero if $E_{b,tx,DL}$ and/or $E_{b,tx,UL}$ exceed the predetermined thresholds.

One or more control channels may be used to support data transmission on the downlink and uplink. A serving base station may be selected such that the desired reliability can be achieved for all control channels, which may ensure reliable data services. The performance of a control channel may be determined by its received signal quality, which may be given by SINR, SNR, C/I, CoT, etc. The received signal quality of each control channel may be measured and compared against a suitable threshold to determine whether the control channel is sufficiently reliable. The reliability of a control channel may also be determined based on an error rate and/or other metrics. A base station may be selected if the control channels are deemed sufficiently reliable. In general, control channel reliability may be ascertained based on received signal quality (e.g., SINR, SNR, C/I, CoT, etc.), control channel performance (e.g., message error rate, erasure rate, etc.), and/or other information. A control channel may be deemed to meet control channel reliability if its received signal quality exceeds a predetermined quality threshold, its error rate or erasure rate is below a predetermined threshold, etc.

A serving base station may also be selected based on terminal and/or network utility metrics. In one design, a network utility metric may be defined for each candidate base station in accordance with one of the following:

$$U_k = \frac{1}{L} \cdot \sum_{l=1}^{L} T_{l,k}, \quad \text{Eq (11)}$$

$$U_k = \frac{1}{L} \cdot \sum_{l=1}^{L} \log(T_{l,k}), \quad \text{Eq (12)}$$

$$U_k = \frac{1}{L} \cdot \sum_{l=1}^{L} \frac{1}{T_{l,k}}, \quad \text{Eq (13)}$$

where $T_{l,k}$ is the throughput of terminal l served by base station k, L is the number of terminals served by base station k, and $U_k$ is a network utility metric for base station k.

Equation (11) provides an arithmetic mean of the throughputs of all terminals served by base station k and may be used to maximize overall throughput. Equation (12) provides a logarithmic mean of the throughputs of the terminals and may be used to achieve proportional fairness. Equation (13) provides a harmonic mean of the throughputs of the terminals and may be used to achieve equal grade of service (GoS). The mean throughputs for a set of base stations may be summed to obtain a total throughput or an overall utility metric U for these base stations. A serving base station may be selected based on the utility metrics $U_k$ of different candidate base stations, the overall utility metric U, and/or other metrics such as the transmit energy metrics $E_{b,tx,DL}$ and/or $E_{b,tx,UL}$, the effective geometries $G_{DL,eff,k}$ and/or $G_{UL,eff,k}$, the projected data rates $R_{DL,k}$ and/or $R_{UL,k}$, etc.

Each base station may communicate with a core network via a backhaul. In most current communication networks, backhaul quality parameters of different base stations are assumed to be similar. Hence, backhaul quality is not taken into account for server selection.

Terminal 110 may be within the vicinity of multiple base stations, which may have very different backhaul quality that may fluctuate over time. Wide variations in backhaul quality may be more common in a heterogeneous network with different types of base stations, which may have different types of backhaul to the core network. The backhaul quality of a base station may limit the base station's ability to serve terminal 110.

In another aspect, a serving base station may be selected for terminal 110 by taking into consideration the backhaul quality of candidate base stations. A server selection entity (or a decision entity) may select the serving base station for terminal 110 when the terminal first accesses the network or is handed off from the current serving base station. The server selection entity may be terminal 110, the current serving base station, or some other network entity. The server selection entity may obtain backhaul quality information for the candidate base stations and may use this information to select the serving base station for terminal 110. The server selection entity may obtain the backhaul quality information for the candidate base stations in various manners.

In one design, a base station may advertise its backhaul quality in an overhead message that may be broadcast over the air. Terminal 110 may receive overhead messages from candidate base stations detected by the terminal. Terminal 110 can ascertain the current backhaul quality of the candidate base stations based on the overhead messages. In one design, terminal 110 may be the server selection entity and may select its serving base station by taking into account the backhaul quality of the candidate base stations. In another design, the server selection entity may be an entity other than terminal 110. Terminal 110 may then send the backhaul quality information for the candidate base stations to the serving base station, e.g., as part of an extended pilot report. In one design, the serving base station is the server selection entity and may use the backhaul quality information to select a new serving base station for terminal 110. In another design, the serving base station is not the server selection entity. The serving base station may then forward the backhaul quality information received from terminal 110 to the server selection entity for use to select a new serving base station for terminal 110. For all designs, over-the-air advertisement of backhaul quality may allow a handoff decision entity to obtain backhaul quality information for candidate base stations even when there is no suitable backhaul connectivity between different base stations in the neighborhood.

In another design, a base station may report its backhaul quality to other base stations in its vicinity, e.g., using the backhaul between different base stations. Each base station may then perform server selection for its terminals by taking into account the backhaul quality of the neighbor base stations.

In yet another design, a base station may report its backhaul quality (e.g., via the backhaul) to a network entity acting as the server selection entity. The network entity may then perform server selection for terminals by taking into account the backhaul quality of the candidate base stations.

A base station may periodically convey its backhaul quality, e.g., in an overhead message sent over the air to terminals or in a backhaul message sent to one or more network entities. The backhaul quality information for the base station may include, e.g., residual capacity of the backhaul for the base station, full capacity of the backhaul, current loading/utilization of the backhaul capacity, energy efficiency of the backhaul, etc. The energy efficiency of the backhaul may be especially relevant if the backhaul is a wireless backhaul link (e.g., for a relay station), which may vary due to RF channel fluctuations.

The server selection entity may obtain the current backhaul quality of all candidate base stations for terminal 110, e.g., via overhead messages and/or backhaul messages. The server selection entity may use this information to select the serving base station for terminal 110, e.g., for initial access or handoff. The server selection entity may thus have information about the backhaul quality/cost associated with each candidate base station, in addition to other metrics (e.g., access channel quality), that may be normally used to select the serving base station. This may allow the server selection entity to select a more appropriate base station to serve terminal 110.

In general, server selection may be performed by terminal 110 or a network entity such as a base station or a network controller. The base stations may send information (e.g., via broadcast and/or unicast channels) to allow terminal 110 to compute metrics. Terminal 110 may then select a serving base station based on the computed metrics and the available information. Alternatively, terminal 110 may send the computed metrics and/or other information to the network entity. The network entity may then select a serving base station for terminal 110 based on the available information. The serving base station may be communicated to terminal 110 via a handover message or some other message.

A base station may send various types of information that may be used for server selection. In one design, a base station may send one or more of the following, e.g., via a broadcast channel:

Number and/or indices of available HARQ interlaces on the downlink and uplink,

Fraction of resources $F_k$ that may be allocated to a terminal,

Interference levels $I_{m,k}$ for different HARQ interlaces and/or different frequency subbands, e.g., actual and target values, Median or tail data rates on the downlink and uplink, QoS guarantees, e.g., whether 50 ms latency can be achieved, Backhaul quality information, e.g., backhaul bandwidth $B_k$, etc, Effective isotropic radiated power (EIRP), Maximum power amplifier (PA) output power, Receiver noise figure, and Battery power of level of the base station if it is battery powered.

Some parameters such as M, $F_k$, $I_{m,k}$ and $B_k$ may be used to compute metrics, as described above. Other parameters such as QoS guarantees, median or tail data rates, etc., may be used as constraints. EIRP and maximum PA output power may be used to estimate pathloss, which may then be used to compute metrics. Noise figure in conjunction with IoT may be used to compute the total interference power. The battery power level of the base station, if it is battery powered, may be used to make handoff decisions for terminals connecting to the base station.

A base station may also send one or more of the following, e.g., via a unicast channel:
Expected user experience,
Bias of handoff boundary to another base station, e.g., in terms of pathloss differential, and
Expected change in network utility due to a terminal being handed into and out of the base station.

Terminal 110 may send one or more of the following (e.g., in an extended pilot report) to a network entity performing server selection:
Pilot strengths of candidate and interfering base stations,
Pathloss to candidate and interfering base stations,
Computed metrics, e.g., transmit energy metrics, nominal geometry, effective geometries, and/or projected data rates for each candidate base station,
Broadcast information received from other base stations, and
Current performance of terminal 110, e.g., data rate, latency, etc.

For initial access, terminal 110 may perform server selection based on broadcast information from the candidate base stations and measurements obtained by terminal 110. Terminal 110 may also use the best downlink SINR to establish an initial connection. For handoff, terminal 110 may send extended pilot reports to candidate base stations and may receive unicast and/or broadcast information that may be used for server selection.

In general, pilot measurements may be made based on any type of pilots transmitted by base stations and relay stations. For example, measurements may be made based on standard pilots transmitted by base stations and used by terminals for synchronization, acquisition, etc. Measurements may also be made based on low reuse pilots or preambles (LRPs), which are pilots transmitted with low time and/or frequency reuse by fewer base stations and/or relay stations on a given time and/or frequency resource. The low reuse pilots may observe less interference and may thus result in more accurate pilot measurements.

FIG. 5 shows a design of a process 500 for conveying backhaul quality information. Process 500 may be performed by a base station (as described below) or some other entity (e.g., a relay station). The base station may determine backhaul quality information indicative of its current backhaul quality (block 512). The backhaul quality information may comprise residual capacity of a backhaul for the base station, full capacity of the backhaul, current loading or utilization of the backhaul capacity, energy efficiency of the backhaul, and/or other information.

The base station may send the backhaul quality information for use by a server selection entity to select a serving base station for a terminal (block 514). In one design, the base station may generate an overhead message comprising the backhaul quality information and may send the overhead message over the air to terminals. In another design, the base station may generate a backhaul message comprising the backhaul quality information and may send the message via the backhaul to at least one network entity. The at least one network entity may comprise at least one neighbor base station or a network controller operating as the server selection entity. The base station may periodically send the backhaul quality information to convey its current backhaul quality.

FIG. 6 shows a design of an apparatus 600 for conveying backhaul quality information. Apparatus 600 includes a module 612 to determine backhaul quality information for a base station, and a module 614 to send the backhaul quality information from the base station for use by a server selection entity to select a serving base station for a terminal.

Figure 7:
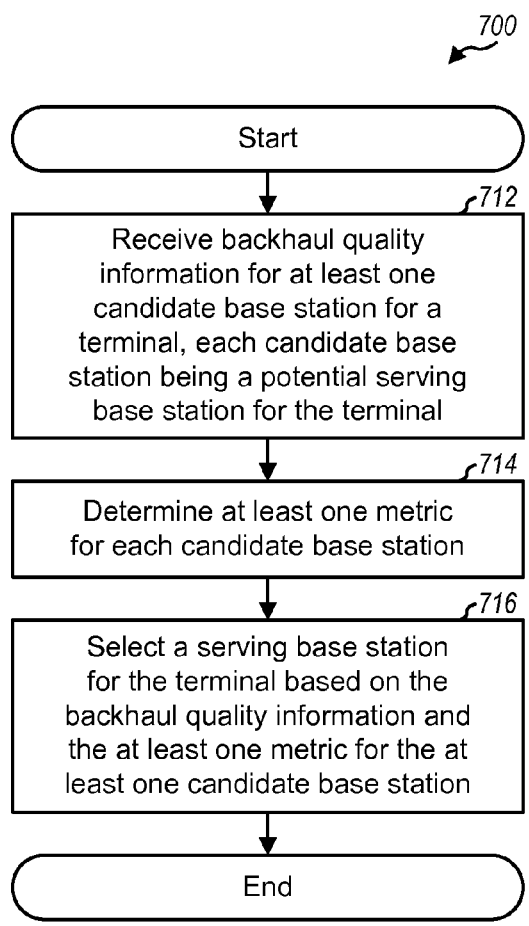
FIGS. 7 and 8 show a process and an apparatus, respectively, for performing server selection.

FIG. 7 shows a design of a process 700 for performing server selection. Process 700 may be performed by a server selection entity, which may be a terminal, a current serving base station for the terminal, or some other network entity. The server selection entity may receive backhaul quality information for at least one candidate base station for a terminal, with each candidate base station being a potential serving base station for the terminal (block 712). In one design, the server selection entity may be the terminal. The terminal may receive an overhead message from each candidate base station and may obtain the backhaul quality information for the candidate base station from the overhead message. In another design, the server selection entity may be the current serving base station or a network controller. The server selection entity may receive a message from each candidate base station via the backhaul and may obtain the backhaul quality information for the candidate base station from the message.

The server selection entity may also determine at least one metric for each candidate base station (block 714). The at least one metric for each candidate base station may comprise a transmit energy metric, an effective geometry metric, a projected data rate metric, a utility metric, and/or other metrics. The server selection entity may select a serving base station for the terminal based on the backhaul quality information and the at least one metric for the at least one candidate base station (block 716). In one design, the terminal may perform process 700 to select its serving base station. In another design, the current serving base station may perform process 700 to select a new serving base station for the terminal. In yet another design, a network entity designated to select the serving base station for the terminal may perform process 700.

Figure 8:
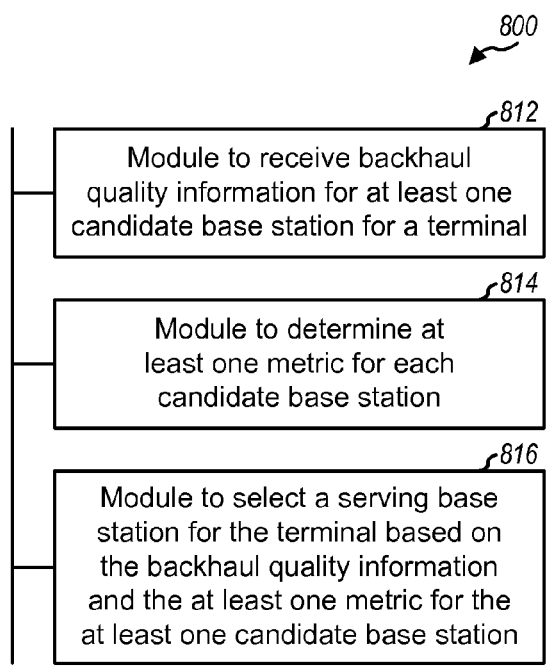

FIG. 8 shows a design of an apparatus 800 for performing server selection. Apparatus 800 includes a module 812 to receive backhaul quality information for at least one candidate base station for a terminal, a module 814 to determine at least one metric for each candidate base station, and a module 816 to select a serving base station for the terminal based on the backhaul quality information and the at least one metric for the at least one candidate base station.

Figure 9:
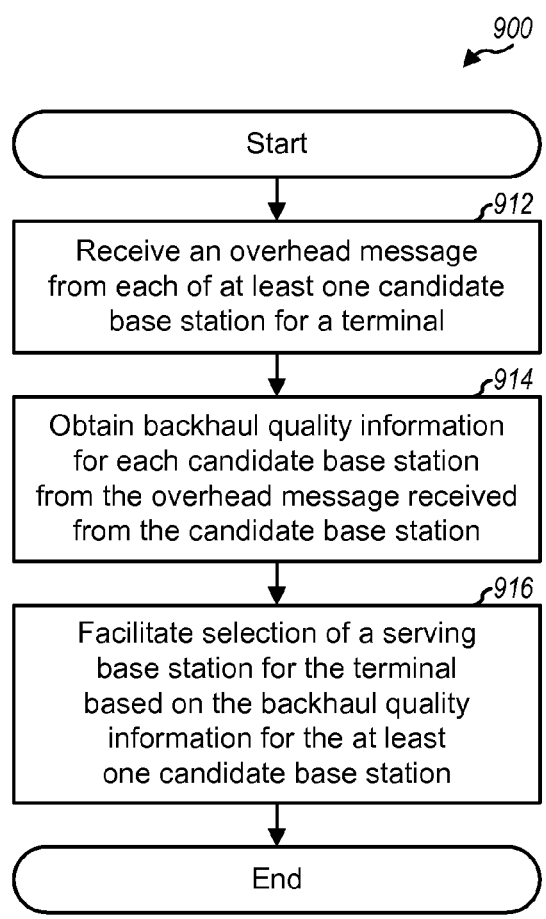
FIGS. 9 and 10 show a process and an apparatus, respectively, for receiving backhaul quality information.

FIG. 9 shows a design of a process 900 for receiving backhaul quality information. Process 900 may be performed by a terminal (as described below) or some other entity (e.g., a relay station). The terminal may receive an overhead message from each of at least one candidate base station for the terminal (block 912). The terminal may obtain backhaul quality information for each candidate base station from the overhead message received from that candidate base station (block 914).

The terminal may facilitate selection of a serving base station for the terminal based on the backhaul quality information for the at least one candidate base station (block 916). In one design of block 916, the terminal may select its serving base station based on the backhaul quality information for the at least one candidate base station. In another design of block 916, the terminal may send the backhaul quality information to its current serving base station. For example, the terminal may generate an extended pilot report comprising the backhaul quality information and may send the report to the current serving base station.

Figure 10:
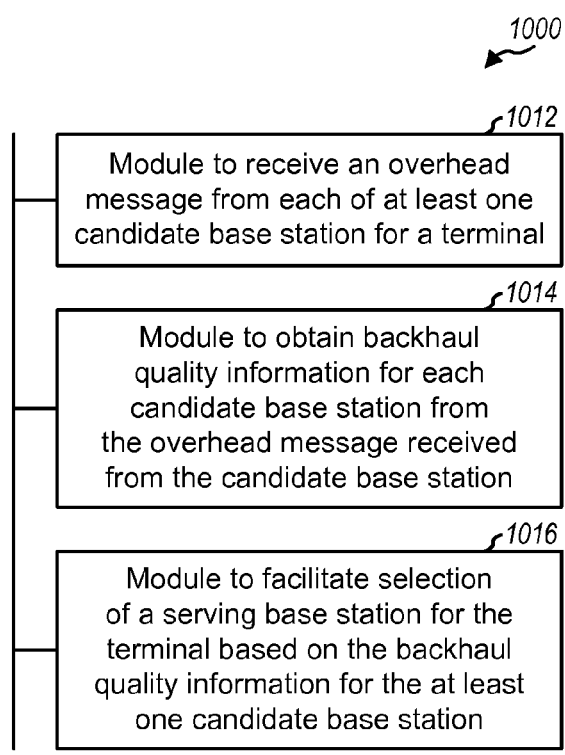

FIG. 10 shows a design of an apparatus 1000 for receiving backhaul quality information. Apparatus 1000 includes a module 1012 to receive an overhead message from each of at least one candidate base station for a terminal, a module 1014 to obtain backhaul quality information for each candidate base station from the overhead message received from that candidate base station, and a module 1016 to facilitate selection of a serving base station for the terminal based on the backhaul quality information for the at least one candidate base station.

The modules in FIGS. 6, 8 and 10 may comprise processors, electronics devices, hardware devices, electronics components, logical circuits, memories, etc., or any combination thereof.

Figure 11:
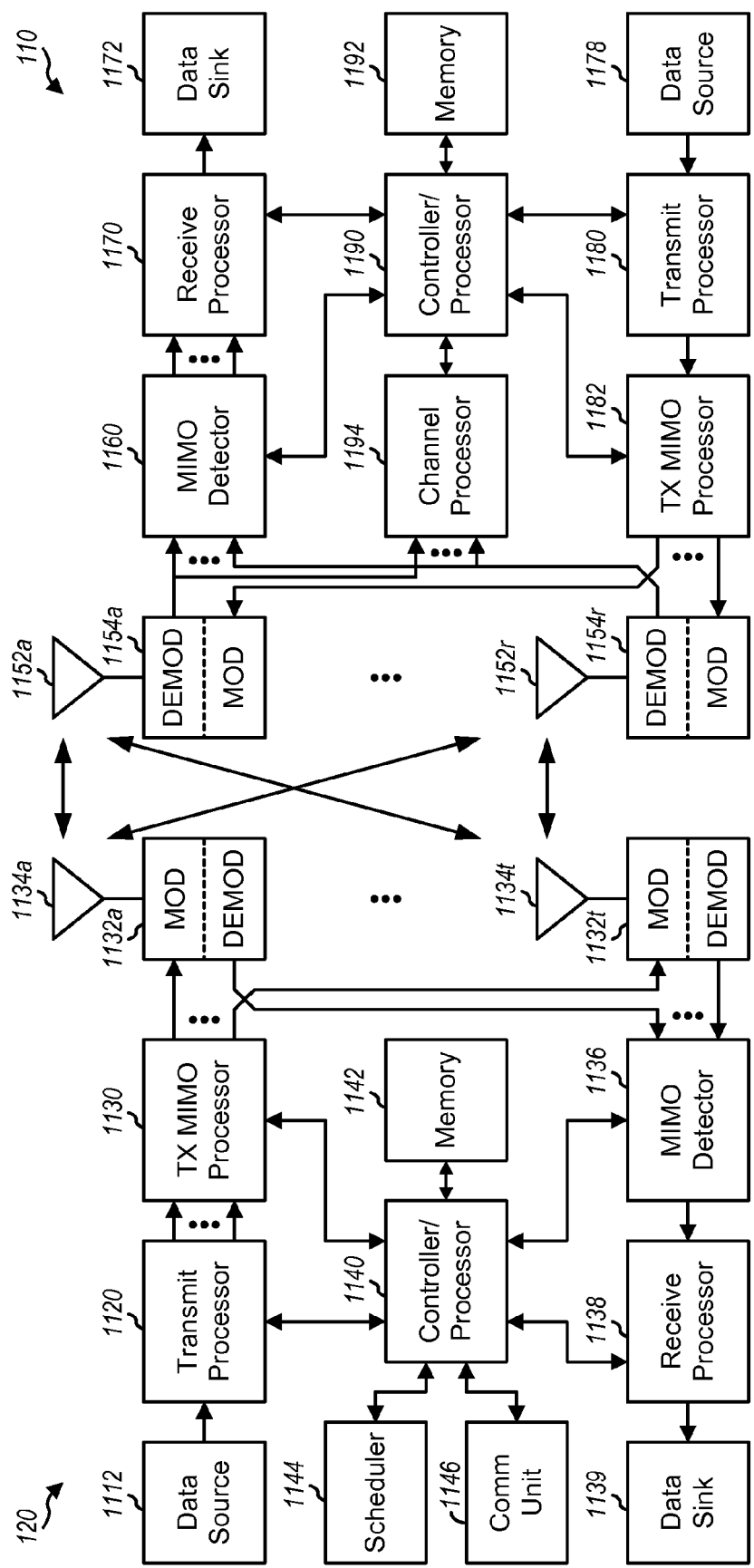
FIG. 11 shows a block diagram of a terminal and a base station.

FIG. 11 shows a block diagram of a design of terminal 110 and base station 120. In this design, base station 120 is equipped with T antennas 1134a through 1134t, and terminal 110 is equipped with R antennas 1152a through 1152r, where in general $T \geq 1$ and $R \geq 1$.

At base station 120, a transmit processor 1120 may receive data for one or more terminals from a data source 1112, process (e.g., encode and modulate) the data for each terminal based on one or more modulation and coding schemes, and provide data symbols for all terminals. Transmit processor 1120 may also receive broadcast and control information (e.g., information used for server selection) from a controller/processor 1140, process the information, and provide overhead symbols. A transmit (TX) multiple-input multiple-output (MIMO) processor 1130 may multiplex the data symbols, the overhead symbols, and pilot symbols. Processor 1130 may process (e.g., precode) the multiplexed symbols and provide T output symbol streams to T modulators (MOD) 1132a through 1132t. Each modulator 1132 may process a respective output symbol stream (e.g., for OFDM, CDMA, etc.) to obtain an output sample stream. Each modulator 1132 may further process (e.g., convert to analog, amplify, filter, and upconvert) the output sample stream to obtain a downlink signal. T downlink signals from modulators 1132a through 1132t may be transmitted via T antennas 1134a through 1134t, respectively.

At terminal 110, R antennas 1152a through 1152r may receive the downlink signals from base station 120 and provide received signals to demodulators (DEMOD) 1154a through 1154r, respectively. Each demodulator 1154 may condition (e.g., filter, amplify, downconvert, and digitize) a respective received signal to obtain received samples and may further process the received samples (e.g., for OFDM, CDMA, etc.) to obtain received symbols. A MIMO detector 1160 may perform MIMO detection on the received symbols from all R demodulators 1154a through 1154r (if applicable) and provide detected symbols. A receive processor 1170 may process (e.g., demodulate and decode) the detected symbols, provide decoded data for terminal 110 to a data sink 1172, and provide decoded broadcast and control information to a controller/processor 1190. A channel processor 1194 may make measurements for parameters (e.g., channel gain h, pathloss p, signal power C, interference I, etc.) used for server selection.

On the uplink, at terminal 110, data from a data source 1178 and control information (e.g., information used for server selection or identifying a selected serving base station) from controller/processor 1190 may be processed by a transmit processor 1180, precoded by a TX MIMO processor 1182 (if applicable), conditioned by modulators 1154a through 1154r, and transmitted via antennas 1152a through 1152r. At base station 120, the uplink signals from terminal 110 may be received by antennas 1134, conditioned by demodulators 1132, detected by a MIMO detector 1136, and processed by a receive processor 1138 to obtain the data and control information transmitted by terminal 110.

Controllers/processors 1140 and 1190 may direct the operation at base station 120 and terminal 110, respectively. Processor 1140 and/or other processors and modules at base station 120 may perform or direct process 500 in FIG. 5, process 700 in FIG. 7, and/or other processes for the techniques described herein. Processor 1190 and/or other processors and modules at terminal 110 may perform or direct process 700 in FIG. 7, process 900 in FIG. 9, and/or other processes for the techniques described herein. Memories 1142 and 1192 may store data and program codes for base station 120 and terminal 110, respectively. A scheduler 1144 may schedule terminals for transmissions on the downlink and/or uplink and may assign resources to the scheduled terminals. A communication (Comm) unit 1146 may support communication with other base stations and network controller 150 via the backhaul.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining backhaul quality information for a base station; and
   sending the backhaul quality information from the base station for use by a server selection entity to select a serving base station for a terminal, which communicates with the serving base station after selection of the serving base station for the terminal.

2. The method of claim 1, wherein the sending the backhaul quality information comprises
   generating an overhead message comprising the backhaul quality information for the base station, and
   sending the overhead message over the air to terminals.

3. The method of claim 1, wherein the sending the backhaul quality information comprises
   generating a message comprising the backhaul quality information for the base station, and
   sending the message via a backhaul to at least one network entity.

4. The method of claim 3, wherein the at least one network entity comprises at least one neighbor base station or a network controller operating as the server selection entity.

5. The method of claim 1, wherein the backhaul quality information is sent periodically by the base station and is indicative of current backhaul quality of the base station.

6. The method of claim 1, wherein the backhaul quality information comprises at least one of residual capacity of a backhaul for the base station, full capacity of the backhaul, current loading or utilization of the backhaul capacity, or energy efficiency of the backhaul.

7. An apparatus for wireless communication, comprising:
   means for determining backhaul quality information for a base station; and
   means for sending the backhaul quality information from the base station for use by a server selection entity to select a serving base station for a terminal, which communicates with the serving base station after selection of the serving base station for the terminal.

8. The apparatus of claim 7, wherein the means for sending the backhaul quality information comprises
   means for generating an overhead message comprising the backhaul quality information for the base station, and
   means for sending the overhead message over the air to terminals.

9. The apparatus of claim 7, wherein the means for sending the backhaul quality information comprises
   means for generating a message comprising the backhaul quality information for the base station, and
   means for sending the message via a backhaul to at least one network entity.

10. A method for wireless communication, comprising:
    receiving backhaul quality information for at least one candidate base station for a terminal, each candidate base station being a potential serving base station for the terminal; and
    selecting a serving base station for the terminal based on the backhaul quality information for the at least one candidate base station, the terminal communicating with the serving base station after selection of the serving base station for the terminal.

11. The method of claim 10, wherein the receiving backhaul quality information comprises
    receiving an overhead message from each candidate base station at the terminal, and
    obtaining backhaul quality information for each candidate base station from the overhead message received from the candidate base station.

12. The method of claim 10, wherein the receiving backhaul quality information comprises
    receiving a message from each candidate base station via a backhaul, and
    obtaining backhaul quality information for each candidate base station from the message received from the candidate base station.

13. The method of claim 10, further comprising:
    determining at least one metric for each candidate base station, wherein the serving base station for the terminal is selected based further on the at least one metric for each candidate base station.

14. The method of claim 13, wherein the at least one metric for each candidate base station comprises at least one of a transmit energy metric, an effective geometry metric, a projected data rate metric, or a utility metric.

15. The method of claim 10, wherein the receiving backhaul quality information and the selecting a serving base station are performed by the terminal.

16. The method of claim 10, wherein the receiving backhaul quality information and the selecting a serving base station are performed by a current serving base station for the terminal to select a new serving base station for the terminal.

17. The method of claim 10, wherein the receiving backhaul quality information and the selecting a serving base station are performed by a network entity designated to select the serving base station for the terminal.

18. An apparatus for wireless communication, comprising:
means for receiving backhaul quality information for at least one candidate base station for a terminal, each candidate base station being a potential serving base station for the terminal; and
means for selecting a serving base station for the terminal based on the backhaul quality information for the at least one candidate base station, the terminal communicating with the serving base station after selection of the serving base station for the terminal.

19. The apparatus of claim 18, wherein the means for receiving backhaul quality information comprises
means for receiving an overhead message from each candidate base station at the terminal, and
means for obtaining backhaul quality information for each candidate base station from the overhead message received from the candidate base station.

20. The apparatus of claim 18, wherein the means for receiving backhaul quality information comprises
means for receiving a message from each candidate base station via a backhaul, and
means for obtaining backhaul quality information for each candidate base station from the message received from the candidate base station.

21. The apparatus of claim 18, further comprising:
means for determining at least one metric for each candidate base station, and wherein the serving base station for the terminal is selected based further on the at least one metric for each candidate base station.

22. A method for wireless communication, comprising:
receiving an overhead message from each of at least one candidate base station for a terminal, each candidate base station being a potential serving base station for the terminal;
obtaining backhaul quality information for each candidate base station from the overhead message received from the candidate base station;
facilitating selection of a serving base station for the terminal based on the backhaul quality information for the at least one candidate base station; and
communicating with the serving base station by the terminal after selection of the serving base station for the terminal.

23. The method of claim 22, wherein the facilitating selection of a serving base station for the terminal comprises selecting the serving base station for the terminal based on the backhaul quality information for the at least one candidate base station.

24. The method of claim 22, wherein the facilitating selection of a serving base station for the terminal comprises sending the backhaul quality information for the at least one candidate base station to a current serving base station for the terminal.

25. The method of claim 22, wherein the facilitating selection of a serving base station for the terminal comprises generating an extended pilot report comprising the backhaul quality information for the at least one candidate base station, and sending the extended pilot report to a current serving base station for the terminal.

26. An apparatus for wireless communication, comprising:
means for receiving an overhead message from each of at least one candidate base station for a terminal, each candidate base station being a potential serving base station for the terminal;
means for obtaining backhaul quality information for each candidate base station from the overhead message received from the candidate base station;
means for facilitating selection of a serving base station for the terminal based on the backhaul quality information for the at least one candidate base station; and
means for communicating with the serving base station by the terminal after selection of the serving base station for the terminal.

27. The apparatus of claim 26, wherein the means for facilitating selection of a serving base station for the terminal comprises means for selecting the serving base station for the terminal based on the backhaul quality information for the at least one candidate base station.

28. The apparatus of claim 26, wherein the means for facilitating selection of a serving base station for the terminal comprises means for sending the backhaul quality information for the at least one candidate base station to a current serving base station for the terminal.

29. An apparatus for wireless communication, comprising:
at least one processor configured to receive an overhead message from each of at least one candidate base station for a terminal, each candidate base station being a potential serving base station for the terminal, to obtain backhaul quality information for each candidate base station from the overhead message received from the candidate base station, to facilitate selection of a serving base station for the terminal based on the backhaul quality information for the at least one candidate base station, to communicate with the serving base station after selection of the serving base station for the terminal.

30. The apparatus of claim 29, wherein the at least one processor is configured to select the serving base station for the terminal based on the backhaul quality information for the at least one candidate base station.

31. The apparatus of claim 29, wherein the at least one processor is configured to send the backhaul quality information for the at least one candidate base station to a current serving base station for the terminal.

32. A computer program product, comprising:
a non-transitory computer-readable medium comprising:
code for causing at least one computer to receive an overhead message from each of at least one candidate base station for a terminal, each candidate base station being a potential serving base station for the terminal,
code for causing the at least one computer to obtain backhaul quality information for each candidate base station from the overhead message received from the candidate base station,
code for causing the at least one computer to facilitate selection of a serving base station for the terminal based on the backhaul quality information for the at least one candidate base station; and
code for causing the at least one computer to communicate with the serving base station by the terminal after selection of the serving base station for the terminal.

* * * * *